United States Patent
Waltner et al.

(10) Patent No.: US 10,507,920 B2
(45) Date of Patent: Dec. 17, 2019

(54) SYSTEMS AND METHODS FOR LIFTING BODY VIBRATION CONTROL

(71) Applicant: Sikorsky Aircraft Corp., Stratford, CT (US)

(72) Inventors: Peter J. Waltner, Royal Palm Beach, FL (US); John R. Herter, Stuart, FL (US)

(73) Assignee: SIKORSKY AIRCRAFT CORP., Stratford, CT (US)

( * ) Notice: Subject to any disclaimer, the term of this patent is extended or adjusted under 35 U.S.C. 154(b) by 623 days.

(21) Appl. No.: 15/155,652

(22) Filed: May 16, 2016

(65) Prior Publication Data
US 2016/0340039 A1    Nov. 24, 2016

Related U.S. Application Data (60) Provisional application No. 62/162,929, filed on May 18, 2015.

(51) Int. Cl.
*B64D 1/22* (2006.01)
*F16F 9/06* (2006.01)
*F16F 15/027* (2006.01)

(52) U.S. Cl.
CPC ............. *B64D 1/22* (2013.01); *F16F 9/067* (2013.01); *F16F 15/027* (2013.01); *F16F 2230/183* (2013.01)

(58) Field of Classification Search
CPC .. B64D 1/22; F16F 2222/126; F16F 2232/08; F16F 9/067; F16F 9/53; H01H 2300/03; H02G 3/12; H02G 3/14; Y02B 90/224; Y04S 20/14
See application file for complete search history.

(56) References Cited

U.S. PATENT DOCUMENTS

| | | | | |
|---|---|---|---|---|
| 1,935,283 A | * | 11/1933 | Adams | B64D 1/22 258/1.8 |
| 2,651,533 A | * | 9/1953 | Miller | B66C 1/34 294/82.1 |
| 2,717,656 A | * | 9/1955 | Bannister | G01V 1/047 102/311 |
| 3,036,797 A | * | 5/1962 | Agusta | B64C 1/22 244/137.1 |
| 3,044,818 A | * | 7/1962 | Tobey | B64C 1/22 244/118.1 |
| 3,265,336 A | * | 8/1966 | Peterson | B64C 1/22 244/137.4 |
| 3,366,353 A | * | 1/1968 | Jackson | B64D 1/02 188/371 |
| 3,540,809 A | | 11/1970 | Paul et al. | |

(Continued)

FOREIGN PATENT DOCUMENTS

WO    WO-2008/018912 A2    2/2008

*Primary Examiner* — Medhat Badawi
(74) *Attorney, Agent, or Firm* — Cantor Colburn LLP (57) ABSTRACT

An external cargo damping system includes lifting gear and a damping assembly. The lifting gear has a lifting body attachment end and an opposed external cargo end, and defines a load path that extends between the lifting body attachment and external cargo ends of the lifting gear. The damping assembly is connected in series with the lifting gear and is disposed along the load path to damp vibratory force transmitted between the lifting gear lifting body attachment and lifting gear ends.

11 Claims, 5 Drawing Sheets

(56) References Cited

U.S. PATENT DOCUMENTS

| | | | | |
|---|---|---|---|---|
| 3,554,468 A * | 1/1971 | McVicar | B64D 1/22 | 244/137.4 |
| 3,601,342 A * | 8/1971 | Piasecki | B64D 1/22 | 212/230 |
| 3,602,544 A * | 8/1971 | Marsh | B64D 1/22 | 212/82 |
| 3,606,435 A * | 9/1971 | Weber | E02F 3/413 | 294/115 |
| 3,608,948 A * | 9/1971 | Kendall | B64D 1/22 | 294/82.15 |
| 3,656,796 A * | 4/1972 | Cook | B66C 1/16 | 294/74 |
| 3,690,602 A * | 9/1972 | Marsh | B64D 1/22 | 244/137.4 |
| 3,829,052 A * | 8/1974 | Flannelly | F16F 15/06 | 248/568 |
| 3,838,836 A * | 10/1974 | Asseo | B64D 1/22 | 244/137.4 |
| 3,904,156 A * | 9/1975 | Smith | B64D 1/22 | 244/118.1 |
| 3,946,971 A * | 3/1976 | Chadwick | B64D 1/08 | 244/137.4 |
| 4,124,181 A * | 11/1978 | Kolwey | B64D 1/22 | 244/137.1 |
| 4,138,078 A * | 2/1979 | Hester | B64D 9/00 | 244/137.4 |
| 4,142,698 A * | 3/1979 | Niebanck | B64C 25/00 | 244/17.17 |
| 4,267,987 A * | 5/1981 | McDonnell | B64D 39/00 | 244/137.4 |
| 4,311,213 A * | 1/1982 | Desjardins | B64C 27/001 | 188/380 |
| 4,364,704 A * | 12/1982 | Dreesen | B66C 13/32 | 414/624 |
| 4,378,919 A * | 4/1983 | Smith | B64D 1/22 | 244/118.1 |
| 4,519,559 A * | 5/1985 | Logan | B64C 25/52 | 244/104 FP |
| 4,553,719 A * | 11/1985 | Ott | B64D 9/00 | 244/118.1 |
| 4,558,837 A * | 12/1985 | Mens | B64C 25/00 | 244/104 FP |
| 4,609,168 A * | 9/1986 | Dean | A61G 3/0891 | 244/118.1 |
| 4,826,109 A * | 5/1989 | Camus | B64D 1/22 | 244/137.4 |
| 4,881,601 A * | 11/1989 | Smith | B64D 1/16 | 169/53 |
| 4,984,757 A * | 1/1991 | Hartung | B64D 1/22 | 144/24.13 |
| 5,143,326 A * | 9/1992 | Parks | B64D 1/22 | 244/118.1 |
| 5,174,552 A * | 12/1992 | Hodgson | B64D 27/26 | 180/300 |
| 5,190,250 A * | 3/1993 | DeLong | B64D 1/22 | 244/118.1 |
| 5,219,143 A * | 6/1993 | Staple | B64C 27/001 | 244/17.11 |
| 5,228,640 A * | 7/1993 | Mouille | F16F 13/00 | 188/283 |
| 5,249,652 A * | 10/1993 | Leitzman | F16F 9/5126 | 188/281 |
| 5,273,333 A * | 12/1993 | Hatfield | B66C 1/34 | 294/82.26 |
| 5,339,580 A * | 8/1994 | Koshika | E04B 1/985 | 248/632 |
| 5,344,203 A * | 9/1994 | Tollenaere | B64D 1/22 | 244/137.1 |
| 5,352,056 A * | 10/1994 | Chandler | B66C 1/66 | 294/82.1 |
| 5,456,341 A * | 10/1995 | Garnjost | B60G 17/018 | 188/378 |
| 5,465,925 A * | 11/1995 | Connolly | B64D 1/12 | 244/137.1 |
| 5,497,858 A * | 3/1996 | Cloud | G21D 1/02 | 188/67 |
| 5,499,785 A * | 3/1996 | Roberts | B64D 1/12 | 244/118.1 |
| 5,562,394 A * | 10/1996 | Brown, Jr. | B66C 1/66 | 294/67.31 |
| 5,593,113 A * | 1/1997 | Cox | B64D 1/08 | 177/245 |
| 5,613,722 A * | 3/1997 | Fandrich | B66C 1/585 | 294/110.1 |
| 5,803,213 A * | 9/1998 | Davis | F16F 9/22 | 188/298 |
| 5,836,548 A * | 11/1998 | Dietz | B64D 1/08 | 244/137.1 |
| 6,189,834 B1 * | 2/2001 | Dietz | B64D 1/08 | 244/118.1 |
| 6,193,223 B1 * | 2/2001 | Jackson | F16F 9/185 | 267/64.12 |
| 6,202,960 B1 * | 3/2001 | Travis | B64C 25/58 | 188/380 |
| 6,378,671 B1 * | 4/2002 | Carlson | B62D 5/006 | 188/267.2 |
| 6,521,090 B1 * | 2/2003 | Vestola | D21G 1/008 | 100/170 |
| 6,533,220 B2 * | 3/2003 | Schuster | B64D 1/22 | 244/118.1 |
| 6,578,796 B2 * | 6/2003 | Maeda | B64D 1/16 | 244/136 |
| 6,676,074 B2 * | 1/2004 | Zoppitelli | B64C 27/35 | 244/17.11 |
| 6,708,926 B2 * | 3/2004 | Bonisch | B64C 1/22 | 244/1 TD |
| 6,851,529 B2 * | 2/2005 | Jones | B60G 17/005 | 188/378 |
| 6,938,887 B2 * | 9/2005 | Achenbach | B60G 17/08 | 188/315 |
| 6,983,833 B2 * | 1/2006 | Ivers | F16F 7/104 | 188/379 |
| 7,461,729 B2 * | 12/2008 | Manfredotti | B64C 27/001 | 188/379 |
| 7,720,582 B2 * | 5/2010 | Makinadjian | B64C 25/60 | 244/100 R |
| 7,887,011 B1 * | 2/2011 | Baldwin | B64C 37/02 | 244/118.1 |
| 7,918,417 B2 * | 4/2011 | Mouille | B64C 25/52 | 244/108 |
| 7,948,237 B2 * | 5/2011 | Kuzmin | G01V 3/16 | 324/330 |
| 8,113,321 B2 * | 2/2012 | McGuire | B64C 27/001 | 188/266.3 |
| 8,226,042 B1 * | 7/2012 | Howell | B63B 27/36 | 244/137.4 |
| 8,292,229 B2 * | 10/2012 | Pancotti | B64C 1/1415 | 244/129.5 |
| 8,413,923 B2 * | 4/2013 | Brenner | B64C 27/001 | 244/17.11 |
| 8,534,607 B2 * | 9/2013 | Tardiff | B64D 17/38 | 244/137.1 |
| 8,534,608 B1 * | 9/2013 | Cox, IV | A01G 23/095 | 244/118.1 |
| 8,606,434 B2 | 12/2013 | Brenner et al. | | |
| 8,695,917 B2 * | 4/2014 | Cranga | B64C 27/001 | 188/379 |
| 8,708,115 B2 * | 4/2014 | Herold | F16F 7/1011 | 188/380 |
| 8,800,730 B2 * | 8/2014 | Battlogg | F16F 9/53 | 188/267.1 |
| 8,888,048 B2 * | 11/2014 | Figoureux | B64D 1/22 | 244/118.1 |
| 8,894,050 B2 * | 11/2014 | Wootten | B60G 17/048 | 267/64.18 |
| 8,915,466 B2 * | 12/2014 | Figoureux | B66C 23/18 | 244/136 |

(56) References Cited

U.S. PATENT DOCUMENTS

| | | | |
|---|---|---|---|
| 8,991,569 B1* | 3/2015 | Lou | F16F 9/50 188/266.5 |
| 9,027,976 B1* | 5/2015 | Tollenaere | B64D 1/22 244/137.4 |
| 9,062,737 B2* | 6/2015 | Hoult | F16F 9/26 |
| 9,080,631 B2* | 7/2015 | Hoult | F16F 9/06 |
| 9,205,922 B1* | 12/2015 | Bouwer | B64D 9/00 |
| 9,242,741 B1* | 1/2016 | Cockell, II | B64D 17/383 |
| 9,618,076 B2* | 4/2017 | Kropp | F16F 15/027 |
| 10,023,313 B2* | 7/2018 | Behrens | B64D 1/22 |
| 2001/0017334 A1* | 8/2001 | Vincent | F16F 9/20 244/17.27 |
| 2005/0242237 A1* | 11/2005 | Scott | B64C 7/00 244/118.1 |
| 2010/0090055 A1* | 4/2010 | Smith | B64C 27/12 244/17.27 |
| 2011/0095132 A1* | 4/2011 | Manfredotti | B64C 27/001 244/122 R |
| 2011/0147148 A1* | 6/2011 | Ripa | F16F 9/44 188/322.13 |
| 2011/0186686 A1* | 8/2011 | Ferrendier | B64C 1/22 244/137.4 |
| 2011/0192932 A1* | 8/2011 | Brenner | B64C 27/04 244/17.13 |
| 2012/0145832 A1* | 6/2012 | Schuster | B64D 1/22 244/137.4 |
| 2012/0279816 A1* | 11/2012 | Smith | F16F 13/08 188/269 |
| 2012/0292434 A1 | 11/2012 | Welsh | |
| 2012/0293177 A1* | 11/2012 | Dodds | G01V 3/17 324/331 |
| 2012/0318916 A1* | 12/2012 | Kroener | B64C 27/04 244/118.1 |
| 2013/0056586 A1* | 3/2013 | Occhiato | B64D 1/22 244/137.4 |
| 2013/0146556 A1* | 6/2013 | Cameron | B66C 13/46 212/276 |
| 2013/0161884 A1* | 6/2013 | Griffin | B64C 27/001 267/140.13 |
| 2013/0200248 A1* | 8/2013 | Polzer | G01R 33/022 248/550 |
| 2013/0241124 A1* | 9/2013 | Bosworth | B64C 27/51 267/140.13 |
| 2013/0264419 A1* | 10/2013 | Rammer | B64C 27/001 244/108 |
| 2013/0270393 A1* | 10/2013 | Shrapnel | B64D 1/22 244/137.4 |
| 2013/0299634 A1* | 11/2013 | Haggard | B64D 1/00 244/110 F |
| 2014/0151169 A1* | 6/2014 | Wehr | F16F 9/52 188/269 |
| 2014/0252170 A1* | 9/2014 | Prud'Homme-Lacroix | B64C 7/00 244/121 |
| 2015/0133593 A1* | 5/2015 | Kissell | C08K 5/175 524/496 |
| 2015/0136900 A1* | 5/2015 | Griffin | B64D 35/00 244/54 |
| 2015/0139800 A1* | 5/2015 | Hendricks | B64C 27/001 416/134 A |
| 2015/0151837 A1* | 6/2015 | Sane | B64D 1/12 701/3 |
| 2015/0360779 A1* | 12/2015 | Behrens | B64D 1/22 244/137.4 |
| 2016/0048131 A1* | 2/2016 | Lesperance | B64D 1/22 701/8 |
| 2016/0236773 A1* | 8/2016 | Jolly | B64C 27/001 |
| 2016/0236779 A1* | 8/2016 | Thomas | B64D 1/22 |
| 2016/0340039 A1* | 11/2016 | Waltner | B64D 1/22 |
| 2017/0326934 A1* | 11/2017 | Wehr | B60G 15/12 |
| 2018/0002007 A1* | 1/2018 | Leguay | B64C 27/64 |
| 2018/0099748 A1* | 4/2018 | Lesperance | B64C 27/04 |
| 2018/0111679 A1* | 4/2018 | Heverly, II | B64C 27/001 |
| 2018/0305038 A1* | 10/2018 | Waltner | B64D 45/06 |

* cited by examiner

SYSTEMS AND METHODS FOR LIFTING BODY VIBRATION CONTROL

CROSS-REFERENCE TO RELATED APPLICATION

This application claims the benefit of priority under 35 U.S.C. § 119(e) to U.S. Provisional Application No. 62/162,929, filed May 18, 2015, which is incorporated herein by reference in its entirety.

BACKGROUND OF THE INVENTION

1. Field of the Invention

The present disclosure relates to vibration control, and more particularly, to vibration control for lifting body carrying external cargo such as helicopters.

2. Description of Related Art

Aircraft commonly include structural elements that shift the natural frequency of the airframe away from the forcing frequency of vibration sources, typically by selectively stiffening portions of the airframe, such that vibration remains below predetermined levels to keep associated crew fatigue and airframe fatigue within manageable levels. The damping effect of such structural elements can change when the forcing frequency changes, such as when the aircraft operating regime changes, or when the natural frequency of the aircraft itself changes, such as when the aircraft weight and/or balance changes. For example, externally loaded cargo can cooperate with the aircraft to form a mass-spring-mass system having a natural frequency (and harmonics) that is different from the natural frequencies of the aircraft. In certain circumstances, the vibratory response of an aircraft carrying external cargo can be similar enough to a given aircraft forcing function that specialized rigging can be required to prevent excessive oscillation of the external load and/or aircraft structure. External cargo carrying operations can therefore require careful planning and execution, and in some circumstances, specialized rigging that is configured for a particular external load.

Such conventional methods and systems have generally been considered satisfactory for their intended purpose. However, there is still a need in the art for improved systems and methods for controlling aircraft vibratory response when carrying external cargo. The present disclosure provides a solution for this need.

SUMMARY OF THE INVENTION

An external cargo system includes lifting gear and a damping assembly. The lifting gear has a lifting body attachment end and an opposed external cargo end, and defines a load path that extends between the lifting body attachment and external cargo ends of the lifting gear. The damping assembly is connected in series with the lifting gear and is disposed along the load path to damp vibratory force transmitted between the lifting gear lifting body attachment and lifting gear ends.

In certain embodiments the damping assembly can be connected in series with the load path between the airframe and the load attachment point. The damping assembly can be connected between the airframe and a lifting body attachment end of the lifting gear. The damping assembly can be connected along a length of the lifting gear, between the load attachment end of the lifting gear and the external load end of the lifting gear. The damping assembly can be connected between the external load end of the lifting gear and an external load suspended below the lifting body. It is contemplated that the damping assembly can include a passive damping assembly, an active damping assembly, or both passive and active damping assemblies.

In an aspect, the passive damping assembly for the external cargo system includes housing with an aperture, a sliding piston, and a floating piston. The sliding piston extends through the housing aperture and is slidably disposed within an interior of the housing. The floating piston is slidably disposed within an interior of the sliding piston and separates a first chamber from a second chamber defined within an interior of the passive damping assembly. The first chamber is a variable volume chamber and the second chamber is a constant volume chamber.

In accordance with certain embodiments, a surface of the floating piston opposite the housing bounds the first chamber, i.e. the variable volume chamber. A face of the floating piston facing the housing can bound the second chamber, i.e. the constant volume chamber. An orifice plate can be fixed within the sliding piston, and can be in fluid communication with the second chamber for regulating movement of the sliding piston through the housing aperture in response to vibrational forces applied to the sliding piston. It is contemplated that the vibrational forces can be applied to the sliding piston through a load path coupling. The load path coupling can be connected to an end of the sliding piston opposite the housing. The load path coupling can be connected to an end of the sliding piston adjacent the housing, such as at the orifice plate. The load path coupling can extend through the interior of the damping assembly or around the damper assembly.

It is also contemplated that, in accordance with certain embodiments, the passive damping assembly can include a compressible fluid port. The compressible fluid port can be in selective fluid communication with the first chamber to add or remove compressible fluid from the first chamber, thereby changing a spring response or damping response of the passive damping assembly. The compressible fluid port can be connected to a compressible fluid source, such as a compressed gas bottle, an accumulator, or a compressor module of a lifting body gas turbine engine. The passive damping assembly can also include an incompressible fluid port in selective fluid communication with the second chamber to add or remove incompressible fluid from the second chamber, thereby changing the length or 'stoke' of the sliding piston assembly in response to a give load. The incompressible fluid source can be connected to an incompressible fluid source, such as a lifting body hydraulic system for example.

In another aspect, the active damping assembly for the external cargo system includes a force generator, a control module operatively associated with force generator, and one or more sensors. The one or more sensors can include accelerometers, load cells, or any other type of sensor suitable for a given application. The sensors can be connected to the control module to provide vibrational data to the control module, and the control module can be operable to cause the force generator to apply counterforces to the lifting gear to damp vibrational forces applied through the lifting gear to the lifting body.

In certain embodiments, a first sensor can be coupled to the lifting body airframe and a second sensor can be connected to the external load suspended from the lifting body. The control module can include a processor communicative with a memory having instructions recorded thereon that, when read by the processor, cause the control module to (a) receive vibration data, (b) compare the vibration data to a predetermined vibration limit (e.g. stored within the memory), and (c) apply counterforce to the lifting gear using the force generator when the data receive from the first and/or second accelerometer is above the predetermined limit.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
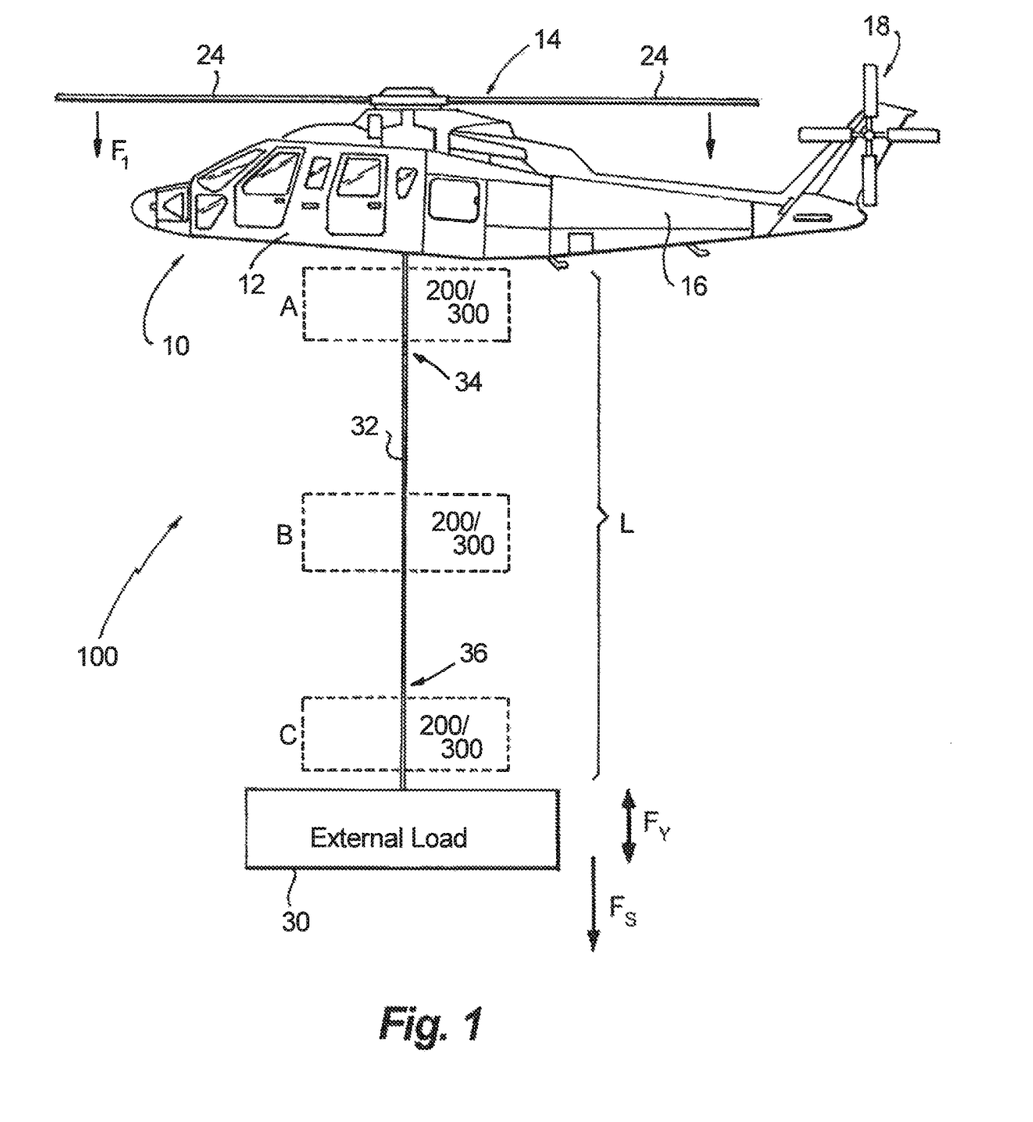
FIG. 1 is a schematic view of a lifting body with an external cargo system, showing an external load suspended from the lifting body by lifting gear and a damping assembly.

Reference will now be made to the drawings wherein like reference numerals identify similar structural features or aspects of the subject disclosure. For purposes of explanation and illustration, and not limitation, a partial view of an exemplary embodiment of an external cargo system for a lifting body external load in accordance with the disclosure is shown in FIG. 1 and is designated generally by reference character 100. Other embodiments of external cargo systems in accordance with the disclosure, or aspects thereof, are provided in FIGS. 2A-7, as will be described. The systems and methods described herein can be used for controlling vibration within lifting body carrying external loads, such as during rotary wing aircraft sling-loading operations.

Referring to FIG. 1, an exemplary lifting body 10, e.g. a rotorcraft, with an external load 30 coupled through external cargo system 100 is shown. Lifting body 10 generally includes an airframe 12, a main rotor system 14, and a tail boom 16 mounting a tail rotor system 18. Main rotor system 14 and tail rotor system 18 are operatively associated with one or more engines carried by airframe 12 and coupled through a rotor-drive unit. Main rotor system 14 includes a plurality of rotor blade assemblies 24 mounted to and projecting radially outward from a hub of main rotor system 14. Although a particular lifting body rotorcraft configuration is illustrated and described in the disclosed, non-limiting embodiment, other configures and/or machines, such as high speed compound rotary wing aircraft with supplemental translational thrust systems, dual contra-rotating coaxial rotor system aircraft, tandem helicopter rotor systems, multi-copters (e.g., quad rotors and the like), tilt-rotors, and tilt-wing aircraft, can also benefit from the present invention.

External load 30 is suspended from lifting body 10 by lifting gear 32 and damping assembly 200/300. Lifting gear 32 includes a lifting body end 34 and an external load end 36. A load path L extends between external load 30 and lifting body 10 through lifting gear 32 and damping assembly 200/300. As indicated by arrow $F_V$ in FIG. 1, external load 30 exerts cyclic upward and downward oriented vibratory forces $F_V$ (which are additive with and of lower magnitude than a substantially constant downward force $F_S$) on lifting body 10 in response to one or more forcing functions $F_1$. Examples of forcing function $F_1$ include relatively low frequencies associated with the passing frequency of rotor blade assemblies 24, relatively high frequencies associated with rotor-drive unit 22, and harmonics thereof. As will be appreciated, forcing function $F_1$ may change in frequency and/or magnitude based on the operating regime of lifting body 10. As will be appreciated, airframe 12 and rotor system 14 may possess natural frequencies that are responsive forcing function $F_1$ or vibrational force $F_V$ in the event that either or both of forcing function $F_1$ or vibrational force $F_V$ are sufficiently close to the natural frequencies of airframe 12 or rotor system 14.

Damping assembly 200/300 is connected in series with lifting gear 32 along load path L. Damping assembly 200/300 may include a passive damping assembly 200 (shown in FIG. 2) configured to reduce vibration in a predetermined frequency range. The frequency range may be tunable, response of passive damping assembly 200 alterable by adding or removing fluid from the passive damping assembly 200 to change to damped frequency range in view of the expected vibrational response of a contemplated external load and lifting body configuration. Alternatively or additionally, damping assembly 200/300 may include an active damping assembly 300 (shown in FIGS. 5-7) configured to dampen an external load based on vibration or load measurements, such as from vibration or load data acquired within airframe 12 or from measurements obtained at external load 30.

Damping assembly 200/300 may be coupled between lifting gear lifting body end 34 and lifting body 10, as shown with reference letter A. In embodiments, damping assembly 200/300 may be coupled along a length of lifting gear 32 between lifting body end 34 and external load end 36, as shown with reference letter B. In certain embodiments, damping assembly 200/300 may be coupled between external load end 36 and external load 30, as shown with reference letter C. As will be appreciated, configuring damping assembly 200/300 for connection to lifting gear 32 externally of airframe 12, i.e. in arrangements A-C, allows for removal of damping assembly 200/300 when lifting body 10 is not conducting sling-loading operations, thereby reducing the weight of lifting body 10.

Figure 2A:
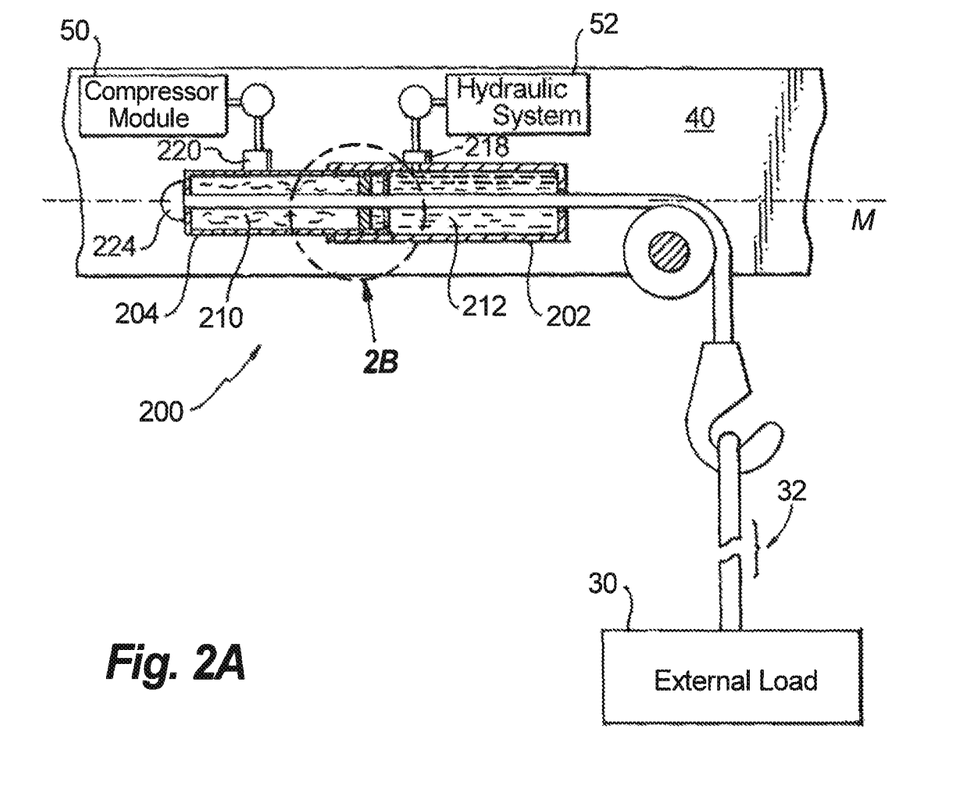
FIG. 2A is a schematic cross-sectional side elevation view of the damping assembly of FIG. 1, showing a passive damping assembly fixed within the lifting body.
Figure 2B:
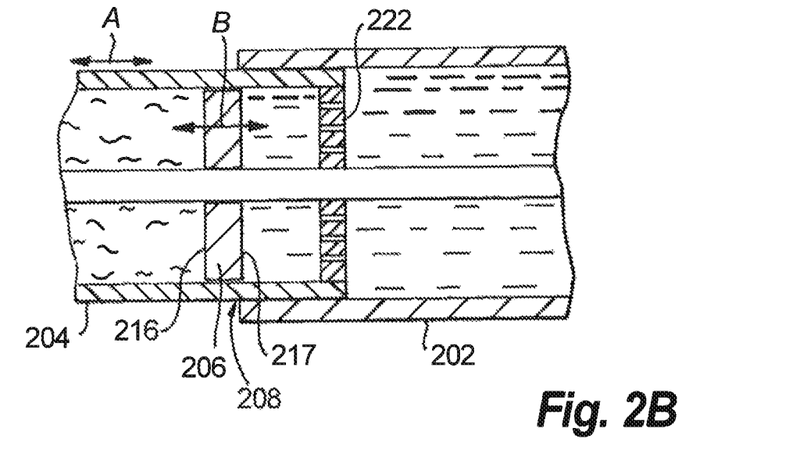
FIG. 2B is a schematic cross-sectional side elevation view of the damping assembly of FIG. 2A, showing a floating piston of the passive damping assembly.

With reference to FIGS. 2A and 2B, passive damping assembly 200 is shown. In the illustrated exemplary embodiment, passive damping assembly 200 is disposed within a floor 40 of airframe 12 and generally includes a housing 202, a sliding piston 204, and a floating piston 206. Housing 202 defines a housing aperture 208 disposed on an end of housing 202. Sliding piston 204 defines a piston aperture on an end facing housing 202, extends through housing aperture 208, and is slidably disposed within an interior of housing 202. As indicated by movement arrow A, sliding piston 204 is movable relative to housing 202. Floating piston 206 is slidably disposed within an interior of sliding piston 204, divides the interior of passive damping assembly 200 into a variable volume first chamber 210 and a constant volume second chamber 212, and is free to move within the interior of passive damping assembly 200. As indicated by movement arrow B, floating piston 206 is movable relative to sliding piston 204 and housing 202.

Figure 3:
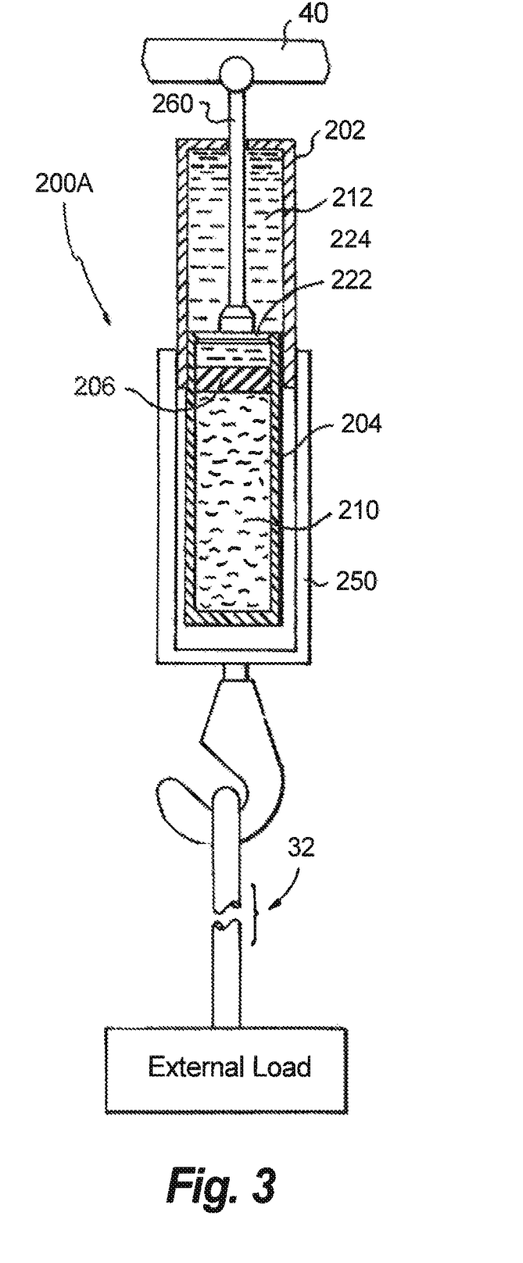
FIG. 3 is schematic side elevation view of the damping assembly of FIG. 2A, showing the damping assembly below the lifting body.

Passive damping assembly 200 also includes an orifice plate 222, a load coupling 224, and defines a movement axis M. Orifice plate 222 is fixed to sliding piston 204 on a side of floating piston 206 opposite first chamber 210 and within second chamber 212 such that movement axis M extends through orifice plate 222. Load coupling 224 is fixed to an end of sliding piston 204 on an end opposite housing 202 and along movement axis M. The load path may either by routed around passive damping assembly 200 and along movement axis M, or through passive damping assembly 200 and along movement axis M. It is also contemplated that load coupling 224 may be coupled to sliding piston 204 within second chamber 212 at or near orifice plate 222, simplifying construction of passive damping assembly 200 by removing the need to route a cable or rod through first chamber 210 (as illustrated in FIG. 3).

With continuing reference to FIGS. 2A and 2B, first chamber 210 is bounded by a face 216 of floating piston 206 oriented toward sliding piston 204. Second chamber 212 is bounded by a face 217 of floating piston 206 oriented toward housing 202. It is contemplated that first chamber 210 contain a compressible fluid, such as air or nitrogen. It is further contemplate that second chamber 212 contain an incompressible fluid, such as oil or hydraulic fluid. This causes loads, e.g. vibratory force $F_v$ (shown in FIG. 1), to displace sliding piston 204 along movement axis M and compress compressible fluid disposed within first chamber 210 against floating piston 206.

Displacement of sliding piston 204 is a function on the load applied to load coupling 224 and an opposing force generated by passive damping assembly 200. The opposing force is a function of the pressure of the incompressible fluid disposed within first chamber 210 and the rate of incompressible fluid flow through orifice plate 222. As vibratory force $F_v$ oscillates, sliding piston 204 moves along movement axis M and provides a variable opposing force which dampens vibratory force $F_v$ (shown in FIG. 1) with a frequency response that is related to the state of the compressible fluid disposed within first chamber 110.

In the illustrated exemplary embodiment, first chamber 210 is in selective fluid communication with a compressible fluid source 50 through a port 220. This allows for changing the mass of compressible fluid disposed within first chamber 210, such as by adding compressed air from a gas bottle, accumulator, or a compressor arranged on lifting body 10, or by venting compressible fluid from first chamber 210. Changing the mass of compressible fluid disposed within first chamber 210 changes the dynamic response of passive damping assembly 200, allowing for damping vibratory forces within different frequency ranges. In this respect the damping response of passive damping assembly 200 may be tuned based on a given external load carried by lifting body 10 such that vibrator force $F_v$ (shown in FIG. 1) does not interact with airframe 12 or rotor system 14 natural frequencies.

Second chamber 212 is in selective fluid communication with hydraulic system 52 through a port 218. This allows for changing the volume of incompressible fluid disposed within second chamber 212, such as by adding or removing hydraulic fluid, thereby changing the volume of second chamber 212. This may apply force to orifice plate 222 as the incompressible fluid traverses orifice plate 222, changing the damping response (e.g. tuning the frequency response and/or damping characteristics) of passive damping assembly 200. As will be appreciated, either or both of first chamber 210 and second chamber 212 may be configured for adding or removing fluid from the respective chamber.

Figure 4:
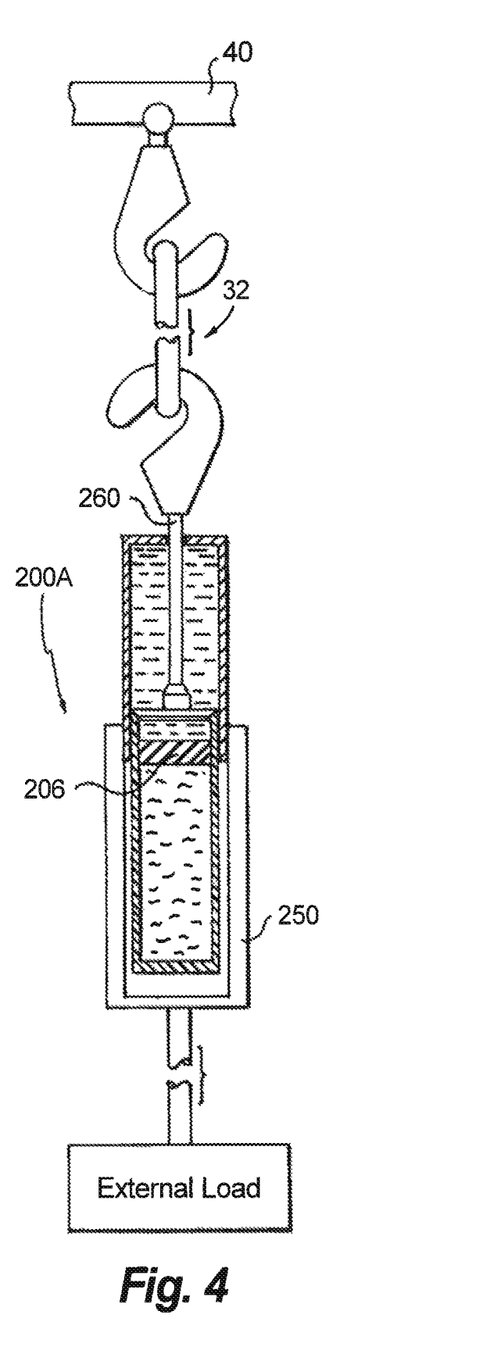
FIG. 4 is a schematic side elevation view of the damping assembly of FIG. 2A, showing the damping assembly suspended below the lifting body by the lifting gear.

With reference to FIGS. 3-4, a passive damper assembly 200A is shown. Passive damper assembly 200A is similar to passive damper assembly 200 and is configured for external attachment to lifting body airframe floor 40. In this respect passive damper assembly 200A additionally includes a yoke 250 and coupling 260. Coupling 260 connects between the lifting body airframe floor 40 and orifice plate 222. Yoke 250 connects between housing 202 and lifting gear 32, thereby defining a load path external of the lifting body airframe, allowing for removal of passive damper assembly 200A when not required for external load carrying operations and improving the accessibility of the device. As illustrated in FIG. 3, coupling 260 directly connects passive damper assembly 200A to floor 40 and lifting gear 32 is suspended below passive damper assembly 200A. As illustrated in FIG. 4, coupling 260 directly connects passive damper assembly 200A to floor 40 through lifting gear 32 such that passive damper assembly 200A is suspended from lifting gear 32.

Figure 5:
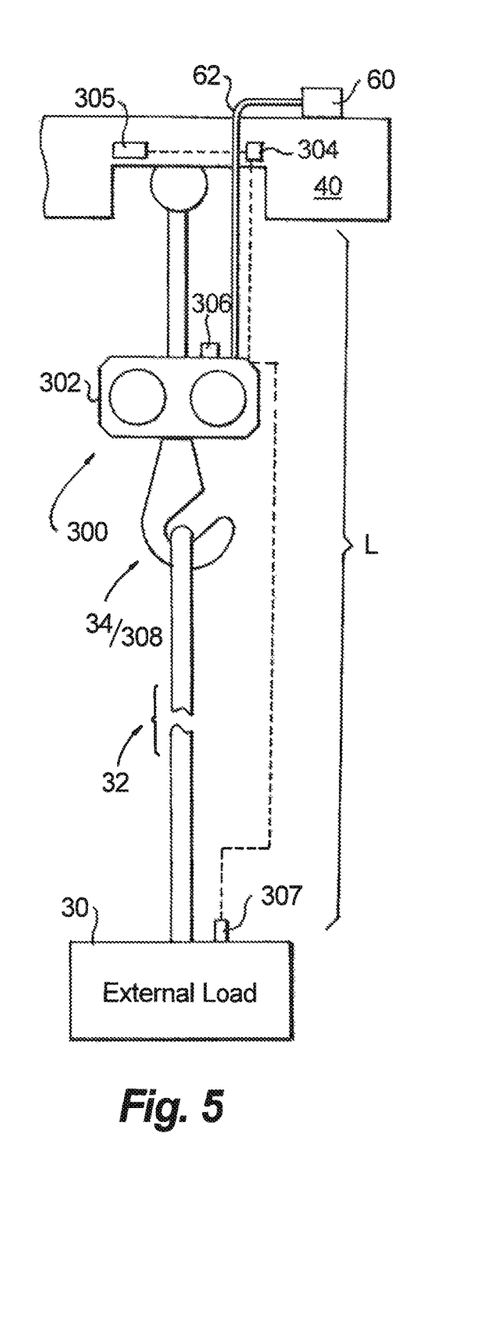
FIG. 5 is a schematic view of the damping assembly of FIG. 1, showing an active damping assembly suspended below the lifting body.

With reference to FIG. 5, an active damping assembly 300 is shown. Active damping assembly 300 includes a force generator 302, a control module 304, a first sensor 305, a second sensor 306, and a third sensor 307. The sensors may be accelerometers, load cells, or any other type of sensor suitable for a given application. In embodiments, accelerometers are coupled to airframe 12 and external load 30, and a load cell is coupled to a hook from which lifting gear 32 is suspended. In certain embodiments, active damping assembly 300 is used in conjunction with passive damping assembly 200 (shown in FIG. 2).

Force generator 302 is configured and adapted to apply a predetermined force to lifting gear 32 along load path L, and may include a linear actuator or a rotary actuator. Control module 304 is operably associated with force generator 302 is configured to calculate the predetermined force that force generator 302 applies to lifting gear 32. A cable 62 connects a power source 60 disposed within airframe 12 to active damping assembly 300 for powering force generator 302. Cable 62 may also provide signaling to control module 304, such as for ceasing active damping when external load 30 is decoupled from lifting gear 32.

First sensor 305 is connected to airframe 12, is communicative with control module 304, and may include an accelerometer configured to measure vibrational force at airframe 12. Second sensor 306 is connected to force generator 30, is communicative with control module 304, and may include an accelerometer configured to measure vibrational force at force generator 302. Third sensor 307 is connected to external load 30, is communicative with control module 304, and may include an accelerometer configured to measure vibrational force, e.g. vibration force $F_v$ (shown in FIG. 1), at external load 30. A load sensor 308 may be integrated with load attachment end 34 of lifting gear 32 that is communicative with control module 304 and which is configured to measure load applied to lifting gear 32. The predetermined force calculated by control module 304 may be calculated using vibration information provided one or more of the accelerometers and the load cell. As will be appreciated, one or more accelerometers may be disposed within the floor of the lifting body airframe, tail section, or cockpit, as suitable for a given application.

Figure 6:
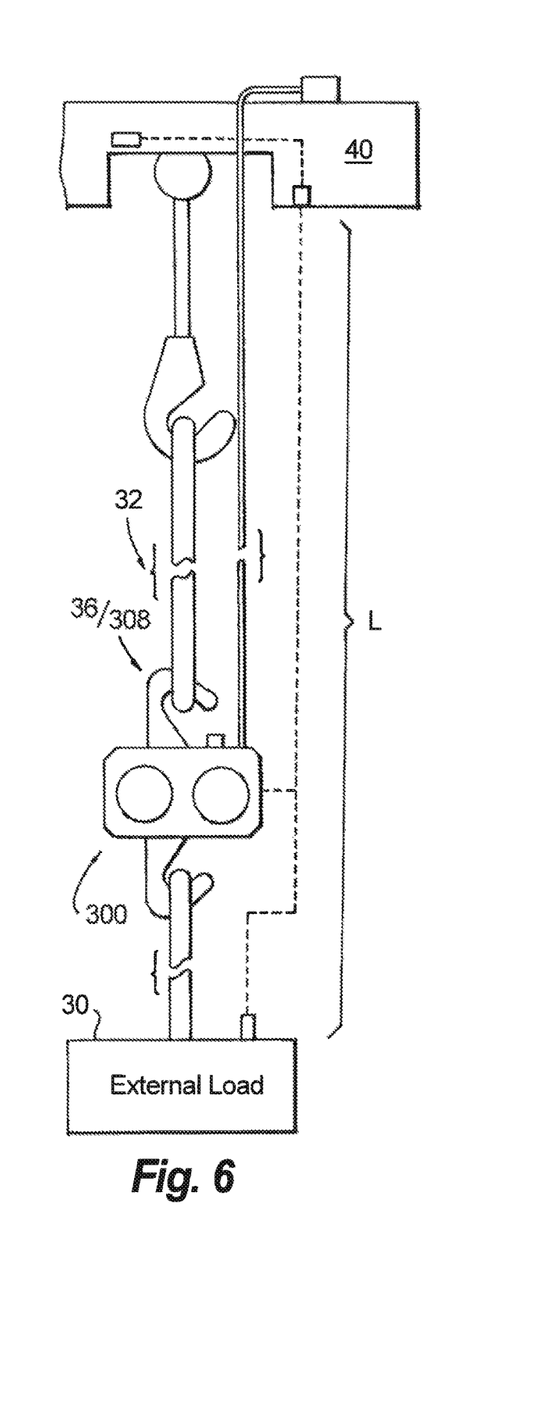
FIG. 6 is a schematic view of the damping assembly of FIG. 1, showing an active damping assembly suspended below the lifting body by the lifting gear.

As illustrated in FIG. 5, active damping assembly 300 is coupled between airframe 12 and lifting body end 34 of lifting gear 32. Alternatively, active damping assembly 300 may be coupled between external load 30 and external load end 36 of lifting gear 32, as illustrated in FIG. 6. Both arrangements allow for rapid removal of active damping assembly 300 from lifting body 10. Attaching active damping assembly 300 between external load 30 and lifting gear 32, i.e. at external load end 36, can simplify rigging external load 30 to lifting body 10 by providing access to lifting gear 32 and active damping assembly 300 prior to connection to lifting body 10. As will be appreciated, force generator 302 may alternatively be connected directly to external load 30.

Figure 7:
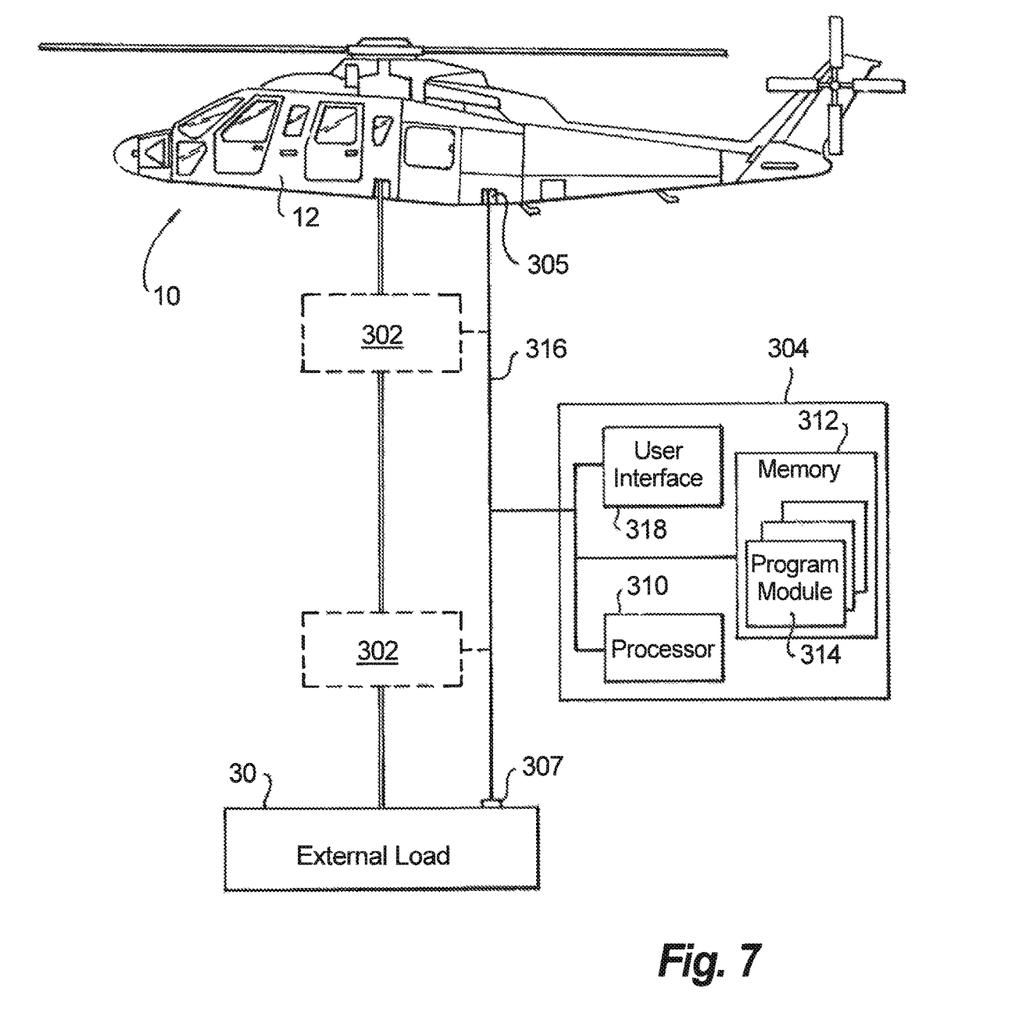
FIG. 7 is a schematic view of the damping assembly of FIG. 1, showing a control module of the active damping assembly operative associated with a force generator at opposite ends of the lifting gear.

Referring now to FIG. 7, control module 304 is shown. Control module 304 includes a processor 310 operatively associated with force generator 302 and communicative with a memory 312. Memory 312 includes a plurality of program modules 314 having instructions recorded thereon that, when read by processor 310, cause control module 304 to undertake certain actions. For example, control module 304 may (a) receive vibration data from one or more accelerometer and/or load cells, (b) compare the received vibration data to a predetermined vibration limit, and (c) when the received vibration exceeds the predetermined limit, actively damp lifting gear 32 to reduce vibration. Actively damping vibrational forces transmitted through lifting gear 32 may include (d) determining a counter force, (e) determining a counterforce application frequency, and (f) applying the determined counter force at the determined frequency using force generator 302.

Optionally or additionally, control module 304 may receive vibration data and use the data to actively control fluid flow into and out of first chamber 210 and second chamber 212 of passive damping assembly 200 through port 218 and port 220, thereby actively damping external load 30 through lifting gear 32 using passive damping assembly 200. In this respect, passive damping assembly 200 may function similarly to active damping assembly 300.

An optional user interface 318 may be connected to processor 310. Optional user interface 318 may allow a pilot or crewmember or lifting body 10 to change the damping response to damping assembly 200/300. For example, through optional user interface 318, control module 304 can be commanded to instruct active damping assembly 300 to begin active damping (e.g. upon connection of a load), or to change the predetermined vibrational limit. Alternatively or additionally, through optional user interface 318, control module 304 can be commanded to change the frequency response of passive damping response, such as by adding or removing fluid from either of the chambers of passive damping assembly 200.

Processor 310 may include an electronic device configured of logic circuitry that responds to and executes instructions. Memory 312 is a computer-readable medium encoded with a computer program. In this regard, memory 312 stores data and instructions readable and executable by processor 310 for controlling the operation of processor 310 in the form of a plurality of program modules 314. Memory 312 may be implemented in a random access memory (RAM), a hard drive, a read only memory (ROM), or a combination thereof.

Program module 314 contains instructions for controlling processor 310 to execute the methods described herein. For example, under control of program module 314, processor 310 (a) acquires acceleration information from a sensor (e.g. one or more of first sensor 305, second sensor 306, and/or third sensor 308, (b) determines an amount of force to apply to lifting gear 32, airframe 12, or external load 30), and (c) causes active damping assembly 300 to generate the determined level of force. It is to be appreciated that the term "module" is used herein to denote a functional operation that may be embodied either as a stand-alone component or as an integrated configuration of a plurality of sub-ordinate components. Thus, program module 314 may be implemented as a single module or as a plurality of modules that operate in cooperation with one another. Moreover, although program module 314 is described herein as being installed in memory 312, and therefore being implemented in software, it could be implemented in any of hardware (e.g., electronic circuitry), firmware, software, or a combination thereof.

Processor 310 may output, to optional user interface 318, a result of an execution of the methods described herein. Alternatively, processor 310 could direct the output to a remote device (not shown), e.g., a HUMS system. It is also to be appreciated that while program module 314 is indicated as already loaded into memory 312, it may be configured on a storage medium for subsequent loading into memory 312 that is also a computer-readable medium encoded with a computer program, and can be any conventional storage medium that stores program module 314 thereon in tangible form. Examples of storage mediums include floppy disks, a compact disk, read only memory, optical storage media, universal serial bus (USB) flash drive, a solid-state storage (SSD) or a compact flash card.

In embodiments described herein, a damping system is included in the mass-spring-mass system to counteract forces resulting from the system resonating in response to the forcing function and/or shift the natural frequency of the mass-spring-mass system away from the frequency of the forcing function, rotor system, and airframe to prevent interaction between the load frequency and aircraft frequency.

In certain embodiments, the damping system includes an active damping assembly for counteracting forces associated with resonance of the mass-spring-mass system from a forcing function. The active damping assembly may be inserted into the mass-spring-system by coupling an active damping between the lifting body and the external load, and may be configured to apply force for counteracting forces resulting from resonance of the mass-spring-mass system formed by the lifting body and suspended external load. In certain embodiments, the active damping assembly communicates with sensors, such as accelerometers and/or load cells, for measuring and controlling vibration by applying counterforce to the rigging or external load prior to the force being transmitted to the lifting body.

Examples of coupling locations for the active damping assembly include (a) in the lifting body airframe, i.e. above the load attachment point, (b) below the load attachment point, i.e. below the rigging pivot point such that the force is cancelled out along the axis that it acts upon, and (c) proximate the load, i.e. in the rigging or between the rigging and the external load. This potentially simplifies external load operations by allowing use of a common rigging assembly for external loads. It can also simplify lifting body testing and qualification when the external load is an infinite load, like the earth for example.

In certain embodiments, the damping system includes a passive damping. The passive damping is configured for shifting the natural frequency of the mass-spring-mass system away from the forcing function for a given load, thereby making the mass-spring-mass system less likely to resonate in response to the forcing function. In accordance with certain embodiments, the passive damping can include an oleo-type device inserted in-line (e.g. in series) with the external load such that a natural frequency of the lifting body and external load suspended by the rigging is sufficiently separated from the rotor and airframe natural frequency. This can be done by providing sufficient stroke for a piston of the passive damping at the maximum external load value to lower the natural frequency of the system to below that of an expected forcing function frequency.

Exemplary embodiments include an in-airframe arrangement where the passive damping is disposed within a floor of the lifting body airframe. This enables changing the frequencies damped by the passive damping by adding or removing fluid from the passive damping using the lifting body hydraulic system or a compressor mounted on the lifting body. In certain exemplary embodiments, the passive damping is mounted externally of the lifting body airframe, such as between the load attachment point and the external load. This can facilitate removal of the passive damping, thereby reducing weight when the lifting body is not carrying external loads.

In certain embodiments, the damper assembly may include elements of both the above-described passive damper assembly and active damper assembly. For example, the compressible gas chamber from the passive damper may cooperate with an active damper linear actuator that actively tunes the response of the passive damper assembly, supplementing (or replacing) the orifice plate of the passive damper assembly.

The methods and systems of the present disclosure, as described above and shown in the drawings, provide for damping systems, damper devices, and methods of damping external loads with superior properties including the ability to shift the natural frequency of the mass-spring-mass system defined by a lifting body and external load and/or the ability to apply forces to offset the forces associated with forcing functions overlapping the system natural frequency. While the apparatus and methods of the subject disclosure have been shown and described with reference to preferred embodiments, those skilled in the art will readily appreciate that changes and/or modifications may be made thereto (such as use in coaxial aircraft, cranes, or other lifting machinery) without departing from the spirit and scope of the subject disclosure.

What is claimed is:

1. An external cargo system for a rotary wing aircraft, comprising:
    lifting gear having rotary wing aircraft and external cargo ends; and
    a damping assembly which is tunable to one or more frequencies of the rotary wing aircraft and which is connected in series with the lifting gear, wherein the lifting gear and the damping assembly define a damped load path extending through the rotary wing aircraft and external cargo ends of the lifting gear to reduce vibrational force transmitted along the load path between an external load suspended from a rotary wing aircraft and the rotary wing aircraft, and wherein the lifting gear is configured to connect the damping assembly to the external load,
    the damping assembly comprising:
        a housing defining an aperture;
        a sliding piston extending through the housing aperture and slidably disposed within an interior of the housing; and
        a floating piston slidably disposed within an interior of the sliding piston, wherein the floating piston separates a variable volume first chamber and a constant volume chamber defined within an interior of the damping assembly.

2. The external cargo system as recited in claim 1, wherein the
    damping assembly is connected (a) between the lifting gear rotary wing aircraft end and the rotary wing aircraft, (b) between the lifting gear rotary wing aircraft end and the external cargo end, or (c) between the lifting gear external load end and the external load suspended from the rotary wing aircraft.

3. The external cargo system as recited in claim 1, wherein a surface of the floating piston opposite the housing bounds the first chamber.

4. The external cargo system as recited in claim 1, further comprising an orifice plate fixed to the sliding piston and in fluid communication with the second chamber.

5. The external cargo system as recited in claim 1, wherein a face of the floating piston facing the housing bounds the second chamber.

6. The external cargo system as recited in claim 1, further comprising a lifting gear coupling connected to an end of the sliding piston opposite the housing.

7. The external cargo system as recited in claim 1, further comprising a load path coupling connected to an end of the sliding piston facing the housing.

8. The external cargo system as recited in claim 1, further comprising a compressible fluid port connected to the sliding piston and in selective fluid communication with the first chamber, wherein the compressible fluid port is connected to a rotary wing aircraft compressor module.

9. The external cargo system as recited in claim 1, further comprising an incompressible fluid port connected to the housing and in selective fluid communication with the second chamber, wherein the incompressible fluid port is connected to a hydraulic system.

10. The external cargo system as recited in claim 1, wherein the housing is (a) disposed with a floor portion of a rotary wing aircraft airframe, (b) suspended below a rotary wing aircraft airframe, or (c) suspended from a ceiling portion of a rotary wing aircraft airframe.

11. A rotary wing aircraft, comprising an airframe and the external cargo system according to claim 1.

* * * * *